D. W. JONES.
STEERING GEAR FOR AUTOMOBILES.
APPLICATION FILED MAY 5, 1922.
1,429,143.
Patented Sept. 12, 1922.
2 SHEETS—SHEET 1.
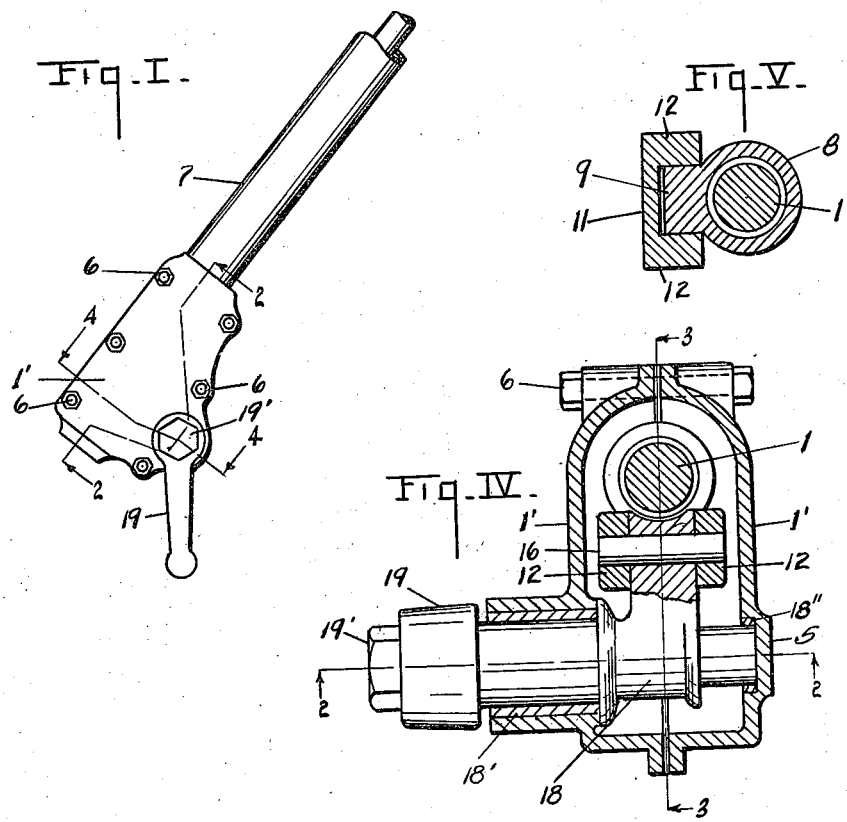
INVENTOR.
David W. Jones
BY
ATTORNEYS

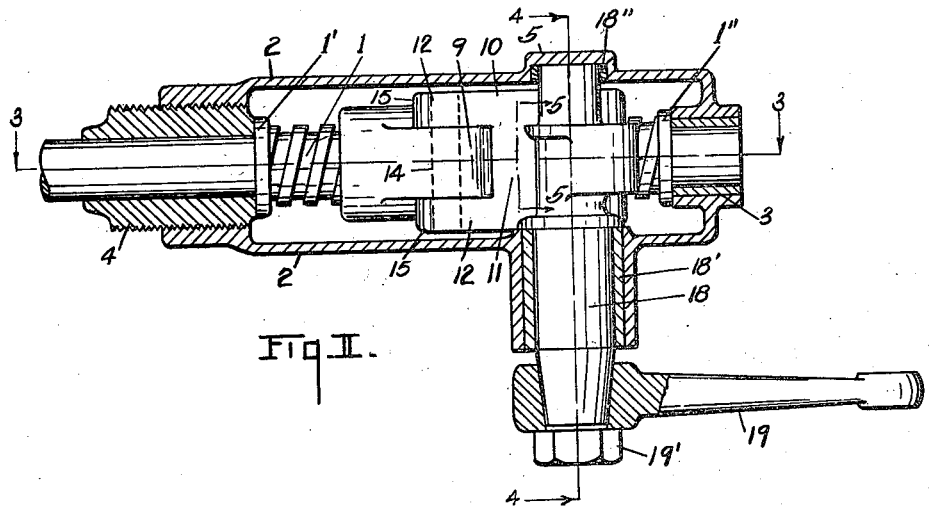
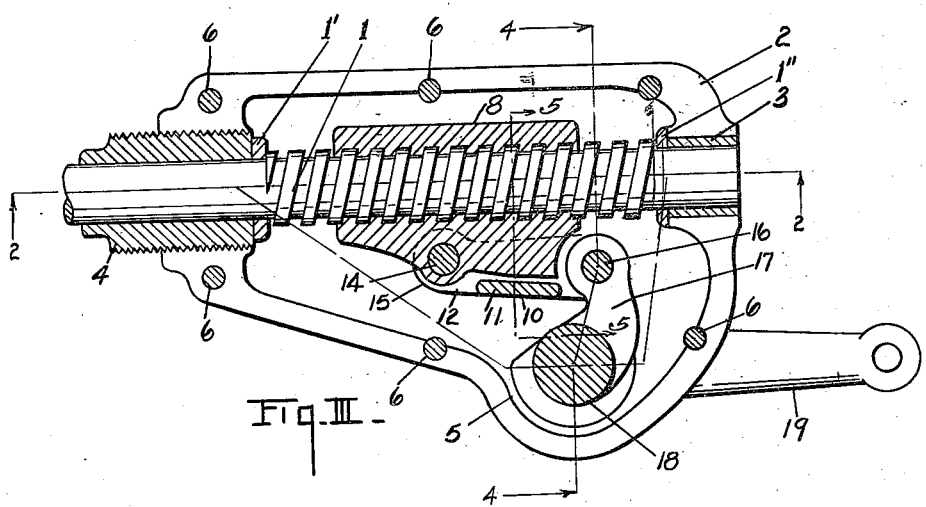

Patented Sept. 12, 1922.

1,429,143

UNITED STATES PATENT OFFICE.

DAVID W. JONES, OF CHICAGO, ILLINOIS.

STEERING GEAR FOR AUTOMOBILES.

Application filed May 5, 1922. Serial No. 558,736.

*To all whom it may concern:*

Be it known that I, DAVID W. JONES, a citizen of the United States, residing at Chicago, county of Cook, State of Illinois, have invented certain new and useful Improvements in Steering Gears for Automobiles, of which the following is a specification.

This invention relates to an improved steering gear for automobiles. It relates particularly to the screw and its connection from the steering column shaft to the steering rockshaft.

The main object of the invention is to provide a simple link connection from the actuating nut to the rocker arm connection to the steering rockshaft.

Objects pertaining to details and economies of construction and operation will definitely appear from the detailed description to follow.

I accomplish the objects of the invention by the devices and means described in the following specification. The invention is clearly defined and pointed out in the claims.

A structure which is a preferred embodiment of the invention is clearly illustrated in the accompanying drawing forming a part of this application in which:

Fig. I is a side elevation view of the lower portion of a steering column with my improved structure in position.

Fig. II is an enlarged detail sectional view on the oblique irregular sectional line 2—2 of Figs. I, III and IV.

Fig. III is a vertical, longitudinal sectional elevation view, portions being shown in full line, taken on a line 3—3 of Figs. II and IV.

Fig. IV is an enlarged detail transverse sectional view taken on the irregular line 4—4 of Figs. I, II and III.

Fig. V is an enlarged detail transverse sectional view through the adjusting screw and nut and double connecting link taken on line 5—5 of Figs. II and III.

In the drawing the sectional views are taken looking in the direction of the little arrows at the ends of the section lines and similar numerals of reference refer to similar parts throughout the several views.

The numbered parts of the drawing will be considered by their numbers. 1 is the screw or worm at the lower end of the steering shaft, the same being carried by the suitable split casing 2. The shaft 1 terminates in a journal carried in a suitable journal bearing 3 at its lower end and in a journal in journal bearing bushing 4 at its upper end. The bushing 4 is screw-threaded externally to adjustably engage within the casing. The casing has a laterally projecting chamber 5 at one side to receive the rocker shaft and its arm. The halves of the casing are held together by the cross-screws or bolts 6 and the shell 7 of the steering column is screw-threaded to engage upon the threaded bearing bushing 4 to which it is suitably locked. Washers 1' and 1'' are at each end of the screw 1 and serve as locating shoulders to engage the bearing bushings 3 and 4.

8 is the elongated steering gear nut adapted to travel back and forth on the screw 1. The nut 8 has a longitudinal rib or projection 9 with opposite parallel faces. The double link 10 having side members 12, 12 connected on the lower side by the plate 11 accurately fit the opposite sides of the elongated projection 9. A pivot pin 14 connects the projecting double end 15 of the link to the upper portion of the projection 9. A pivot pin 16 connects the lower projecting double end of the link to the arm 17 of the rocker-shaft 18. Shaft 18 is supported in suitable bearing bushings 18' and 18'' in the sides of the divided casing 2. A rocker arm 19 is secured to the end of the rocker shaft 18 by the usual lock nut construction 19' for the steering link connection.

From this description it will be seen that there is very intimate connection between the longitudinal nut and the connecting link to the rocker arm 18. The parts fit together very closely and are very effectively kept in line so that there is no lost motion from side to side movement. The elongated nut effectively fitting the screw prevents lost motion between these parts, particularly when the chamber around the same is filled with oil or grease.

The actuating parts may be variously encased. I have shown a simple divided casing because it provides an effective support for the rocker shaft and the same is very readily connected and supported in the chassis of an automobile.

Having thus described my invention, what I claim as new and desire to secure by Letters Patent, is:

1. In a steering gear means for an automobile, the combination of a suitably divided casing, a steering shaft and a screw suitably journaled therein, a transversely disposed rocker shaft suitably journaled in the said casing, an elongated nut on the said screw having an elongated guide projection at one side with opposite parallel faces, a double link with opposed parallel portions engaging the said elongated guide projection on the said nut and suitably pivoted thereto at the upper end, and a rocker arm on the said rocker shaft with its end embraced by the downwardly projecting ends of the said link, coacting as described for the purpose specified.

2. In a steering gear means for an automobile, the combination of a casing, a steering screw suitably supported therein, a transversely disposed rocker shaft, an elongated nut on the said screw having an elongated guide projection at one side with opposite parallel faces, a double link with opposed parallel portions engaging the said elongated guide projection on the said nut and suitably pivoted thereto at the upper end, and a rocker arm on the said rocker shaft with its end embraced by the downwardly projecting ends of the said link, coacting as described for the purpose specified.

3. In a steering gear for an automobile, the combination with the steering shaft of a screw at the end thereof supported in suitable journal bearings, an elongated nut thereon with an elongated projecting guide portion with opposite parallel faces, a double link with opposed parallel portions engaging the said guide projection, a pivot pin therethrough, and connections from the lower end of the link to actuate the steering gear when the screw is rotated.

In witness whereof, I have hereunto set my hand and seal.

DAVID W. JONES. [L. S.]